United States Patent

Diepeveen

[15] 3,672,651

[45] June 27, 1972

[54] ADJUSTABLE MOUNT

[72] Inventor: John C. Diepeveen, 1737 Kimberly Drive, Sunnyvale, Calif. 94087

[22] Filed: July 13, 1970

[21] Appl. No.: 54,179

[52] U.S. Cl. ..........................266/23 F, 83/699, 266/23 HH
[51] Int. Cl. ..........................B23k 7/10
[58] Field of Search..............266/23 F, 23 HH, 23 L; 83/699

[56] References Cited

UNITED STATES PATENTS

| | | | |
|---|---|---|---|
| 1,921,888 | 8/1933 | Schmidt | 266/23 F |
| 1,674,843 | 6/1928 | Spencer | 266/23 F |
| 1,812,239 | 6/1931 | Hentschel et al. | 266/23 HH X |
| 2,385,665 | 9/1945 | Warwick | 266/23 F UX |

*Primary Examiner*—Frank T. Yost
*Attorney*—Townsend and Townsend

[57] ABSTRACT

A mount for connecting a member to a support to permit adjustment of the member in a number of different directions. The mount includes a shaft to which the member is coupled, the shaft being movable along its axis and rotatable about its axis to provide for adjustment of the member in two degrees of freedom. Means is provided to secure the member to the shaft laterally of the same for adjustable movement relative thereto transversely thereof to provide a third degree of freedom.

15 Claims, 3 Drawing Figures

FIG. I

INVENTOR.
JOHN C. DIEPEVEEN
BY Townsend and Townsend
ATTORNEYS

INVENTOR
JOHN C. DIEPEVEEN

BY Townsend and Townsend

ATTORNEYS

ADJUSTABLE MOUNT

This invention relates to improvements in the mounting of tools and other members and, more particularly, to a mount which is adjustable to permit movement of a member to be mounted in a number of degrees of freedom.

In mounting tools or other mechanical parts relative to a predetermined reference, it is desirable that the mounting be such that the tool or part to be mounted be adjustable for movement in a number of different directions. This feature provides for precision in mounting the tool and compensates for variations in size between different tools where precision mounting is not only desirable but necessary.

While the present invention is suitable for mounting a number of different tools or mechanical parts in an operative position with respect to other structure, it is suitable for use in mounting a wire-cutting torch of the type used with a wire-bonding machine. With such a machine, fine wires are bonded to various locations on a semiconductor component, such as an integrated circuit chip, and to terminals to which the various locations on the component are to be electrically connected. The wire is cut by the flame of the torch after the wire has been bonded to a specific location on the component and to a respective terminal. The torch also serves to heat the wire to form a bead thereon so that the wire can be carried by the bonding tool to the bonding location without causing any relative movement between the bonding tool and the wire. The torch itself must be precisely located with respect to the wire and the bonding tool so as to assure the cutting of the wire and the forming of the bead.

To effect this end, it is desirable that the torch be mounted in a manner such that it can be adjustably positioned with respect to the wire to be severed and be movable in a number of degrees of freedom. Preferably, the torch is mounted for movement along an arcuate path so that, during its sweep past the wire, the flame of the torch will contact the wire to sever the same. Not only should the length of the arc be adjustable, but also the plane of the arc and the initial position of the torch should be adjustable as well.

The present invention provides a mount for a tool or mechanical part such as the torch of a wire-bonding machine, wherein the tool can be adjustably positioned for swinging movement through an arc which is adjustable in length with the arc being movable in a plane whose distance from a determined reference can be adjusted. Furthermore, the mount of this invention has a tool holder which can be shifted in a plane substantially parallel with the plane of rotation thereof, whereby the tool can be moved toward or away from an object, such as the gold wire for use with a wire-bonding machine. The mount of this invention allows for precision adjustments of the mounted tool in the three degrees of freedom mentioned above to assure accuracy in movement of the mounted object at all times notwithstanding the wide latitude in the adjustments which can be made with the mount.

The primary object of this invention is, therefore, to provide an improved mount for a tool or other mechanical part wherein the mount allows for precision adjustment of the operative position of the tool or part in a number of degrees of freedom whereby the tool can be presented to a workpiece with great accuracy and can be shifted relative thereto without affecting such accuracy.

Another object of this invention is to provide a mount of the type described wherein the mount allows for rotation of the mounted tool or part in a plane which is adjustable both in its length and in the distance by which it is spaced from a predetermined reference while, at the same time, the tool is itself mounted for movement toward and away from the axis of rotation of the mount whereby three, mutually independent degrees of freedom are provided for the adjustment of the tool.

A further object of this invention is to provide a mount for holding the wire-cutting torch of a wire-bonding machine wherein the torch can rotate about a vertical axis, can move up or down relative to a predetermined reference, and can move toward and away from the wire to be cut along a generally rectilinear path to thereby provide precision adjustment of the torch with respect to the wire.

Other objects of this invention will become apparent as the following specification progresses, reference being had to the accompanying drawings for illustrations of an embodiment of the mount.

Figure 1:
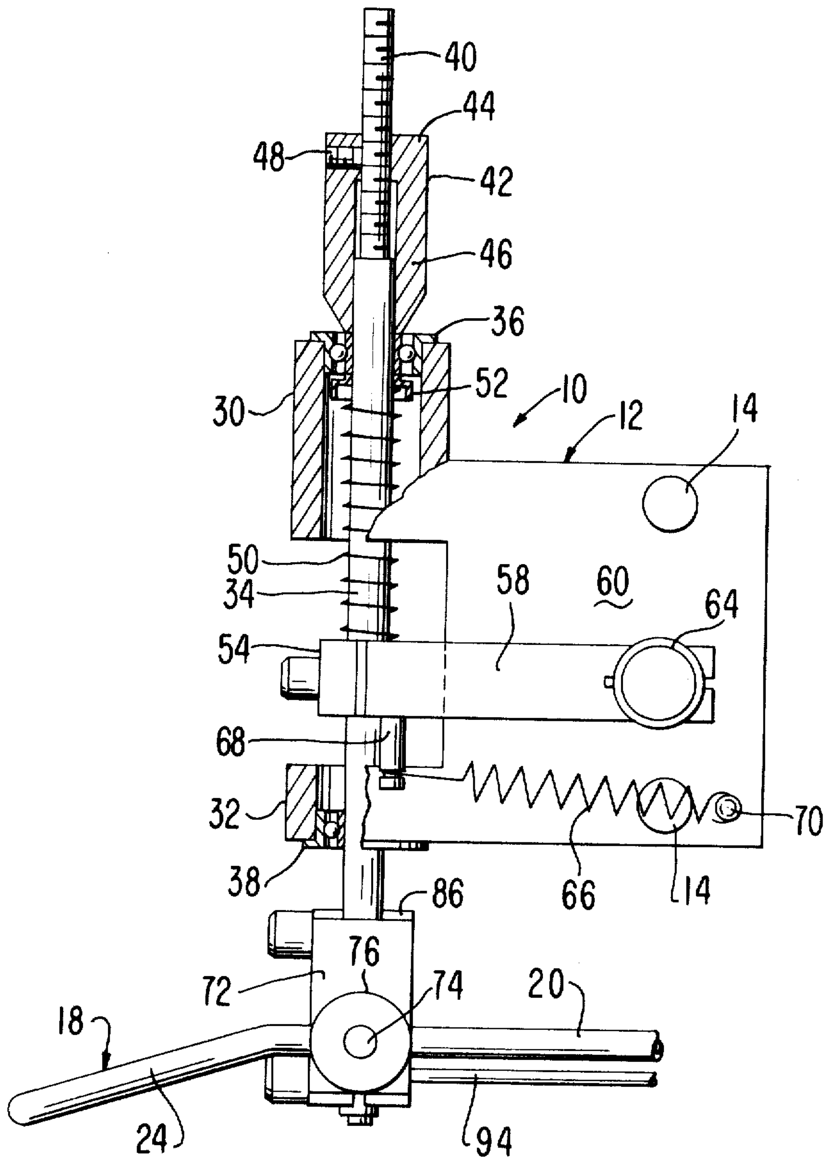
FIG. 1 is a side elevational view of the mount of this invention, parts being broken away and in section to illustrate details of construction.

The mount of this invention is broadly denoted by the numeral 10 and includes a plate 12 secured by fasteners 14 to a fixed support 16 near which a particular type of tool or mechanical part is to be mounted. For purposes of illustration only, a gas torch 18 is to be mounted adjacent to support 16 by mount 10. Torch 18 comprises a tube having straight sections 20 and 22 and a curved section 24 interconnecting sections 20 and 22. A nozzle 26 is at the outer end of section 22. Section 20 has a fitting 28 which is adapted to be coupled to the source of combustible gas, whereby a flame can be supported at nozzle 26.

Figures 2, 3:
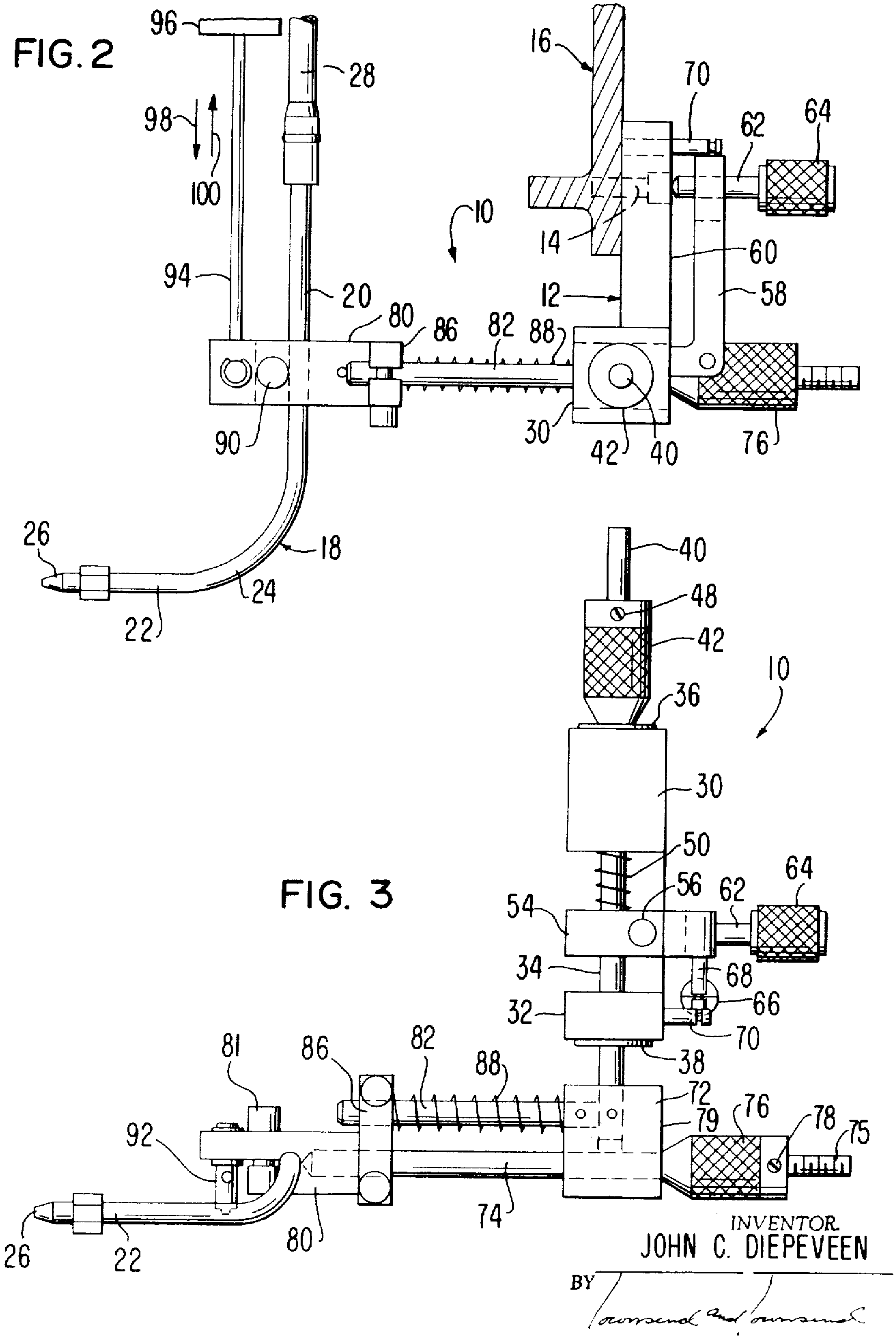
FIG. 2 is a top plan view of the mount of FIG. 1.
FIG. 3 is a side elevational view of the mount.

Plate 12 has a pair of aligned tubular members 30 and 32 secured thereto, the members being spaced apart as shown in FIG. 1 and FIG. 3. While plate 12 can be mounted in any attitude, it is for purposes of illustration only, mounted in FIGS. 1 and 3 in a vertical position; thus, member 30 is above member 32.

A shaft 34 extends through members 30 and 32 and is supported by ball bearings 36 and 38 coupled with members 30 and 32, respectively. The shaft is fitted in the inner races of these bearings in a manner to allow the shaft to rotate about its axis relative to members 30 and 32 and to allow the shaft to move axially through the bearings. Bearing 36 extends into the member 30 from the upper end thereof and bearing 38 extends into member 32 from the lower end thereof, the outer races of the bearings being press fitted into respective members.

The upper end of shaft 34 has a threaded segment 40 to which an adjusting head 42 is threadably coupled. Head 42 has an upper, internally threaded portion 44 threadably mounted on segment 40 and a lower, unthreaded, cylindrical portion 46 which is in sliding engagement with the adjacent unthreaded, cylindrical part of shaft 34. A set screw 48 carried by portion 44 serves to releasably lock head 42 in a fixed position on the shaft. The lower end of head 42 is tapered toward shaft 34 and engages only the inner race of bearing 36. Thus, head 42 rotates with shaft 34 when set screw 48 engages portion 40 but can rotate on the shaft to cause movement of the latter relative to member 30 when set screw 48 is backed off from portion 40.

A coil spring 50 surrounds the central portion of shaft 34 and has one end received within an inverted cup-shaped member 52 having an annular upper part in engagement with the lower end of the inner race of bearing 36. Member 52 is slideable on shaft 34. The opposite end of the spring engages a clamp 54 which is clamped to shaft between members 30 and 32. The clamp is comprised of a pair of relatively shiftable parts on opposite sides of the shaft and a screw fastener 56 provides the necessary clamping force for the two parts.

An arm 58 is rigid to clamp 54 and extends laterally therefrom along the adjacent flat face 60 of plate 12. A screw 62 having a head 64 is threadably mounted on the outer end of arm 58. The opposite end of screw 62 engages face 60 of plate 12 and adjustably positions arm 58 and thereby shaft 34 relative to plate 12.

A coil spring 66 is connected at one end to a pin 68 depending from arm 58 and at the opposite end to a pin 70 extending laterally from face 60. Spring 66 operates to bias arm 58 in a counterclockwise sense when viewing FIG. 2.

The lower end of shaft 34 has a block 72 rigidly secured thereto. A shaft 74 is shiftably mounted on block 72 and extends therethrough. Shaft 74 has a threaded segment 75 similar to segment 40 at one end thereof. A head 76 similar in all respects to head 42, is threadably coupled to shaft 74 and has a set screw 78 for releasably locking head 76 to shaft 74.

Head 76 has a flat end face which slidably engages the adjacent flat side face 79 of block 72. Thus, when head 76 rotates relative to shaft 74, the shaft moves relative to block 72. A spring hereinafter described biases shaft 74 to the left when viewing FIG. 3.

The opposite end of shaft 74 is secured to a tool holder 80 which is a clamp having a pair of relatively shiftable parts between which section 20 of torch 18 is clamped. A screw 81 draws the two parts together to clamp the torch. A stub shaft 82 is secured to block 72 and extends outwardly therefrom toward holder 80. Shaft 82 passes through an upright extension 86 on holder 80 and is shiftable with respect to this extension. A coil spring 88 biases holder 80 in a direction away from block 72 to thereby urge shaft 74 to the left when viewing FIG. 3.

A pin 92 extends downwardly from holder 80 and is coupled with a rigid link 94 which extends to and is connected with a force applying means 96 which operates to apply oppositely directed forces to link 94, the direction of the forces being denoted by arrows 98 and 100 (FIG. 2).

In operation, torch 18 is secured to holder 80 after plate 12 has been secured to support 16. Torch 18 is then ready to be used and the combustible gas is directed thereto and ignited at nozzle 26.

For purposes of illustration only, torch 18 is adapted to cut a fine wire used with a wire-bonding machine by sweeping past a vertical stretch of the wire as the torch rotates under the influence of means 96. The torch rotates about an axis through shaft 34 as a force is applied by means 96 to link 94 in the direction of arrow 100 to pull the link and thereby holder 80 through an arc having a predetermined length. Means 96 can be coupled to the die-bonding machine for automatic actuation after the completion of a particular wire-bonding operation. Thus, the torch can swing past the wire at the proper time to cut the wire and to form a bead on the wire to prepare the same for the next bonding operation.

To adjust the initial position of the torch with respect to its arcuate path of travel, screw 62 is adjusted by manipulating head 64, whereby arm 58 can be moved toward or away from face 60 of plate 12. Thus, by increasing the distance between arm 58 and face 60, nozzle 26 is moved closer toward the wire which is to be cut. Conversely, moving arm 58 closer to face 60 causes nozzle 26 to move further away from the wire.

The initial position of the torch can be further adjusted by manipulating head 76 which moves shaft 74 along its length with respect to block 72. Thus, to move nozzle 26 to the left when viewing FIG. 3, shaft 74 is also moved to the left by rotating head 76 in a counterclockwise sense when viewing shaft 74 from the right, assuming right-hand threads on shaft 74 and head 76. Spring 88 urges the shaft and thereby holder 80 to the left when head 76 is rotated in this direction. Conversely, nozzle 26 is moved to the right as head 76 is rotated in a clockwise sense, further compressing spring 88.

Torch 18 is raised and lowered by manipulating head 42 coupled with shaft 34. Thus, to raise the torch, head 42 is rotated in a clockwise sense when viewing FIG. 2 since it also causes shaft 34 to elevate along its length, again assuming right-hand threads. Conversely, rotating head 42 in a counterclockwise sense when viewing FIG. 2 allows shaft 34 and thereby torch 18 to descend.

After the proper positions have been reached, the set screws on heads 42 and 76 can be tightened on respective shafts. Then, the position of torch 18 will be secured and wire-cutting operations can be carried out with the assurance that there will be no change in the position of the torch. Minute changes can be made in this position if necessary if there are position changes in the wire itself.

What is claimed is:

1. A tool mount comprising: a support; a shaft; means mounting the shaft on the support for rotation about its longitudinal axis and for translation along said axis; first means coupled with the shaft and the support for adjustably rotating the shaft about said axis; second means coupled with the shaft for adjustably shifting the same along said axis relative to the support; spring means biasing the shaft in a predetermined direction; and means carried by the shaft for attaching a tool thereto.

2. A mount as set forth in claim 1, wherein said mounting means includes a pair of spaced, aligned, tubular members, each member having a bearing coupled with the shaft.

3. A mount as set forth in claim 1, wherein said mounting means comprises a pair of aligned, tubular members, there being a bearing coupled with each member, respectively, said shaft extending through said members and being journaled in said bearings and movable axially thereof.

4. A mount as set forth in claim 3, wherein said shifting means includes head threadably coupled to the shaft on one side of one of the bearings for adjustably moving the shaft relative thereto, and means on the opposite side of said one bearing for biasing the shaft in one direction.

5. A tool mount comprising: a support, a shaft; means mounting the shaft on said support for axial and rotational movement of the shaft relative to the support; means coupled with the shaft for adjustably and axially moving the same relative to the support; means secured to the shaft for adjusting the initial rotative position of the shaft relative to the support; spring means coupled with the shaft for biasing the same into said position; and means carried by the shaft and extending laterally therefrom for coupling a tool thereto in spaced relationship to the axis thereof.

6. A mount as set forth in claim 5, wherein said tool coupling means comprises a tool holder, and means shiftably mounting the holder on the shaft for movement transversely thereof in opposite directions.

7. A tool mount comprising: a support having a pair of spaced, vertically aligned, tubular members; a bearing for each member, respectively; a shaft extending through said members and being coupled with the bearings for rotation relative to the members and for rectilinear movement through the bearings and the members, the upper portion of the shaft being externally threaded; a head threadably mounted on said upper shaft portion and engaging the adjacent bearing, said head being rotatable about the shaft to cause the latter to move relative to and through said members; an arm; means securing the arm to the shaft between said members with the arm extending laterally from the shaft; an adjustment device shiftably carried by the arm adjacent to its outer end, said device being engageable with the support; means biasing the arm toward the support; a tool holder; means mounting the tool holder on the lower end of the shaft for movement transversely thereof in opposed directions; means biasing the tool holder in a direction away from the shaft; and means coupled with said mounting means for shifting the tool holder transversely of the shaft.

8. A tool mount as set forth in claim 7, wherein said mounting means includes a block secured to the lower end of the shaft, a second shaft shiftably carried by the block and disposed transversely of the first-mentioned shaft, and a head threadably mounted on the second shaft and engaging the block, the tool holder being secured to the second shaft at a location thereon remote from said head.

9. A tool mount as set forth in claim 8, wherein said bias means includes a stub shaft secured to the block and extending outwardly therefrom longitudinally of the second shaft, an extension secured to and projecting laterally from the second shaft, said stub shaft extending through the extension and being shiftable relative thereto, and a coil spring surrounding the stub shaft and engaging said block and said extension, said spring being compressed to bias the extension and thereby the second shaft in a direction outwardly of said block.

10. A tool mount as set forth in claim 7, wherein is provided means coupled with the tool holder for alternately applying oppositely directed forces thereto to thereby cause rotation of the tool holder about the axis of said shaft.

11. A tool mount comprising: a support; a shaft; having a threaded segment; a bearing having an inner race and an outer race and disposed for mounting the shaft on said support for axial and rotational movement of the shaft relative to the support; a head threadably mounted on the segment and having an end engaging only the inner race for adjustably and axially moving the shaft relative to the support; means secured to the shaft for adjusting the initial rotative position of the shaft relative to the support; and means carried by the shaft and extending laterally therefrom for coupling a tool thereto in spaced relationship to the axis thereof.

12. A mount as set forth in claim 11, wherein is included a coil spring surrounding the shaft and engaging the inner race of the bearing, said spring being under compression to bias the shaft in one direction.

13. A tool mount comprising: a support; a shaft; means mounting the shaft on said support for axial and rotational movement of the shaft relative to the support; means coupled with the shaft for adjustably and axially moving the same relative to the support; an arm rigidly secured to the shaft for rotation therewith; an adjustment device shiftably mounted on the arm and engageable with the support in spaced relationship to the shaft for adjusting the initial rotative position of the shaft relative to the support; and means carried by the shaft and extending laterally therefrom for coupling a tool thereto in spaced relationship to the axis thereof.

14. A mount as set forth in claim 13, wherein said adjustment device includes a screw, and including means biasing the arm for rotation in a predetermined direction about the axis of the shaft.

15. A tool mount comprising: a support, a shaft; means mounting the shaft on said support for axial and rotational movement of the shaft relative to the support; means coupled with the shaft for adjustably and axially moving the same relative to the support; means secured to the shaft for adjusting the initial rotative position of the shaft relative to the support: a tool holder; a second shaft substantially perpendicular to the first shaft; means on the second shaft for shiftably securing the same to the first shaft for movement transversely thereof in opposed directions, said tool holder being mounted on the second shaft in spaced relationship to the axis of the first shaft; and means coupled with the second shaft for biasing the same in a predetermined direction with respect to said first shaft.

* * * * *